(12) United States Patent
Matus et al.

(10) Patent No.: US 6,753,497 B1
(45) Date of Patent: Jun. 22, 2004

(54) METHOD AND APPARATUS FOR INITIATING WELDING ARC USING PLASMA FLOW

(75) Inventors: Tim A. Matus, San Antonio, TX (US); Lin Zhang, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/390,524

(22) Filed: Mar. 17, 2003

(51) Int. Cl.[7] .............................................. B23K 10/00
(52) U.S. Cl. ......................... 219/121.46; 219/121.45; 219/121.57; 219/121.54
(58) Field of Search ..................... 219/121.46, 121.45, 219/121.39, 121.54, 121.57, 121.52, 75, 121.59, 137 WM, 137 R

(56) References Cited

U.S. PATENT DOCUMENTS

| | | | |
|---|---|---|---|
| 4,767,907 A | * | 8/1988 | Otani et al. ............. 219/121.56 |
| 4,791,268 A | | 12/1988 | Sanders et al. ......... 219/121.57 |
| 5,317,126 A | | 5/1994 | Couch, Jr. et al. ...... 219/121.51 |
| 5,893,985 A | | 4/1999 | Luo et al. .............. 219/121.48 |
| 6,034,350 A | | 3/2000 | Heraly et al. ............ 219/130.4 |
| 6,075,224 A | | 6/2000 | De Coster ............... 219/130.4 |
| 6,121,571 A | * | 9/2000 | Siniaguine et al. ..... 219/121.54 |

* cited by examiner

*Primary Examiner*—Mark Paschall
(74) *Attorney, Agent, or Firm*—Ostrager Chong & Flaherty LLP

(57) ABSTRACT

Methods and apparatus for initiating a welding arc by directing a plasma jet into the space between the tip of the welding electrode and the workpiece. This is done while an electrical potential is applied between the electrode and the workpiece. The ionized plasma gas renders the space between the electrode and the workpiece more conductive, thereby reducing the voltage threshold needed to initiate an arc between the electrode and the workpiece. When the voltage threshold reaches the level of the applied electrical potential, the arc will be initiated.

20 Claims, 3 Drawing Sheets

METHOD AND APPARATUS FOR INITIATING WELDING ARC USING PLASMA FLOW

BACKGROUND OF THE INVENTION

This invention generally relates to methods and apparatus for starting a welding arc. In particular, the invention relates to methods and apparatus for starting a TIG welding arc.

Many methods of welding are known in the art, each with its own advantages and disadvantages. Common welding processes include gas welding, oxyacetylene brazing and soldering, shielded metal arc welding (SMAW) or "STICK" welding, gas metal arc welding (GMAW) or "wire feed" welding, gas tungsten arc welding (GTAW) or "TIG" welding, and plasma cutting. TIG welding is perhaps the cleanest, most precise of all hand-held welding operations. Although the method and apparatus of the present invention is preferably directed to a TIG welding operation, one skilled in the art will appreciate that the present invention may have applications for many other welding processes.

A conventional TIG welding process will now be described with reference to FIG. 1. In TIG welding, a concentrated high-temperature arc is drawn between a non-consumable tungsten electrode 10 and a workpiece 14, workpiece 14 being connected to the output of a welding power source (not shown) via a work clamp 24. Electrode 10 is nested in a torch 16, the torch including a shielding gas source 18, such as a cup, to direct a shielding gas 20, such as argon, helium, a mixture thereof, or other inert or non-inert gases, to a welding site 22 on workpiece 14. Torch 16 receives a flow of shielding gas 20 from a gas tank (not shown). In accordance with a known technique, the welder may strike an arc by touching or scraping the electrode 10 against the workpiece 14 to close a circuit between the electrode 10 and the work clamp 24. As electrode 10 is drawn away from the workpiece 14, an arc 12 is initiated. The welder then feeds a bare welding rod 26 to welding site 22. More precisely, the tip of the welding rod 26 is dipped into the weld puddle. The arc that crosses the gap from the electrode tip to the workpiece causes underlying workpiece material at the welding site to melt, thereby creating a molten puddle 28. During a single welding pass, the arc 12 and the welding rod 26 must be moved in unison in order to effect a weld bead. The displaced arc leaves the molten puddle 28 in its wake. The portion of the molten puddle furthest from the arc hardens continuously to leave a weld bead 30 joining two pieces of metal.

Numerous problems persist with the aforementioned physical method of striking an arc because the tip of the tungsten can contaminate the weld due to touching or scraping the electrode against the workpiece. Often, due to arcing a piece of the tip remains in the molten puddle and contaminates the weld. Also, the welder must then resharpen or replace the electrode. Not only does this process inconvenience the welder, but it also wastes time and resources, which ultimately imparts a higher cost to each weld.

One known solution to the above problems has been to use a high-frequency signal to initiate and maintain the arc. A high-frequency signal ionizes the shielding gas, allowing the welding power to jump the gap between electrode and workpiece. However, high frequency, too, has its drawbacks. The high-voltage, low-amperage noise from the high-frequency circuitry often causes electrical interference with surrounding equipment, making its use unacceptable in certain applications. Also, the high-frequency signal can be tough on TIG torches and work leads because the high voltage causes a stress to be applied to the insulation of the weld cables.

Another arc starting method that avoids the problems associated with the scratch start is the "lift" arc method. Lift arc starting involves touching the electrode to the workpiece without the necessary scraping to generate a spark. Some known lift arc methods utilize a separate low-current power circuit, in addition to the power circuits already present in a welding device, to create a small monitoring voltage between the electrode and work clamp. Control circuitry monitors the voltage between the electrode and work clamp and, when a short is detected (i.e., the electrode has been touched to or brought in close proximity with the workpiece), enables the power circuit to provide an initial regulated current to warm, but not melt the electrode. When the control circuitry detects a significant torch-to-workpiece voltage (i.e., the electrode is no longer touching or is not in close proximity to the workpiece), the control circuitry enables the power circuit to provide full user-selected welding power. However, the separate power circuit required to provide the small monitoring voltage leads to additional cost and complexity of the circuitry in the welding power source. Furthermore, some lift arc start methods fail to reliably regulate the output current level before and after the short is detected. An improved "lift" arc technique, directed to overcoming the foregoing disadvantages, is disclosed in U.S. Pat. No. 6,034,350. Still some welding procedures require that the tungsten not touch the work piece.

Another known solution, disclosed in U.S. Pat. No. 6,075,224, is to start a welding arc by applying an arc starting signal to ionize the shielding gas before enabling welding output power. The welding device disclosed in U.S. Pat. No. 6,075,224 comprises a power circuit to provide welding power, a shielding gas source to provide a shielding gas at a welding site disposed between an electrode and a workpiece, an arc starter circuit (e.g., a high-frequency start circuit) to apply an arc starting signal to ionize the gas, and a controller coupled to a control input of the power circuit. The arc starting steps are also controlled by the controller. First, the controller enables a flow control meter to begin supplying shielding gas to the welding site. When the pre-flow period has expired, the controller enables the arc starter circuit, which generates an arc starting signal that is provided to the power output for a predetermined period of time during which the resulting arc ionizes the flow of shielding gas particles. The starting arc is not suitable for welding. A predetermined time after the arc starting signal is applied, the controller enables the power circuit such that welding power is provided and an arc suitable for welding is drawn between the electrode and the workpiece.

U.S. Pat. No. 4,791,268 discloses a plasma arc torch and a method using contact starting. This is a torch system used for cutting materials, such as steel, stainless steel or aluminum. The plasma arc torch includes a moveable cathode and a fixed anode that are automatically separated by the buildup of gas pressure within the torch after a current flow is established between the cathode and the anode. The gas pressure draws a non-transferred pilot arc to produce a plasma jet. The torch is thus contact started, not through contact with an external workpiece, but through internal contact of the cathode and anode. Once the pilot arc is drawn, the torch may be used in the non-transferred mode, or the arc may be easily transferred to a workpiece. In a preferred embodiment, the cathode has a piston part that slidingly moves within a cylinder when sufficient gas pressure is supplied. In another embodiment, the torch is a hand-held unit and permits control of current and gas flow with a single control.

There is an ongoing need for further improvements in methods and apparatus for initiating and maintaining a TIG or other welding arc.

BRIEF DESCRIPTION OF THE INVENTION

The invention is directed to methods and apparatus for initiating a welding arc by directing a plasma jet into the space between the tip of the welding electrode and the workpiece. This is done while an electrical potential is applied between the electrode and the workpiece. The ionized plasma gas renders the space between the electrode and the workpiece more conductive, thereby reducing the voltage threshold needed to initiate an arc between the electrode and the workpiece. When the voltage threshold reaches the level of the applied electrical potential, the arc will be initiated.

One aspect of the invention is a method of initiating an arc between an electrode and a workpiece, comprising the following steps: (a) causing shielding gas to flow toward the workpiece and around the tip of the electrode; (b) applying an electrical potential between the electrode and the workpiece; and (c) directing a plasma jet into the space between the tip of the electrode and the workpiece.

Another aspect of the invention is a method of initiating an arc between an electrode and a workpiece, comprising the following steps: (a) causing an annular curtain of shielding gas to flow toward the workpiece, with the tip of the electrode being disposed within the curtain; (b) applying an electrical potential between the electrode and the workpiece; (c) causing current to flow between the electrode and a contact shield that is in contact with the electrode; (d) filling a space between the electrode and contact shield with plasma gas; and (e) separating the electrode and the contact shield to release the plasma gas toward the workpiece and around the tip of the electrode, the separation between the electrode and contact shield resulting in the production of an arc that is transferred to the workpiece.

A further aspect of the invention is a method of initiating an arc between an electrode and a workpiece, comprising the following steps: (a) causing shielding gas to flow toward the workpiece and around the tip of the electrode; (b) applying an electrical potential between the electrode and the workpiece; (c) applying an electrical potential between the electrode and a contact shield that surrounds a portion of the electrode and is not in contact with the electrode; (d) moving the contact shield from a position of no contact with the electrode to a position where it is in contact with the electrode, as a result of which current begins to flow between the contact shield and the electrode; (e) causing pressurized plasma gas to flow into a space between the electrode and the contact shield, the space being closed off by contact of the contact shield with the electrode; and (f) moving the contact shield from the position in contact with the electrode to a position not in contact with the electrode, as a result of which plasma gas flows into the space between the electrode and the workpiece. The foregoing steps result in initiation of an arc between the electrode and the workpiece.

Yet another aspect of the invention is a torch comprising: an electrode; a first shield surrounding the electrode to form a first passageway therebetween; and a second shield surrounding the first shield to form a second passageway therebetween, wherein at least one of the electrode and the first shield is movable relative to the other in an axial direction, the first shield being in contact with the electrode in a first positional state and not in contact with the electrode in a second positional state. The contact of the electrode and the first shield blocks one end of the first passageway in the first positional state, whereas the first passageway is not blocked when the electrode and the first shield are in the second positional state.

A further aspect of the invention is a system comprising: an electrode comprising a tip; a workpiece disposed at a distance below the tip of the electrode, the workpiece being at an electric potential relative to the electrode; means for directing shielding gas to flow toward the workpiece and around the tip of the electrode; and means for directing a plasma jet into the space between the tip of the electrode and the workpiece that initiates an arc therebetween.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
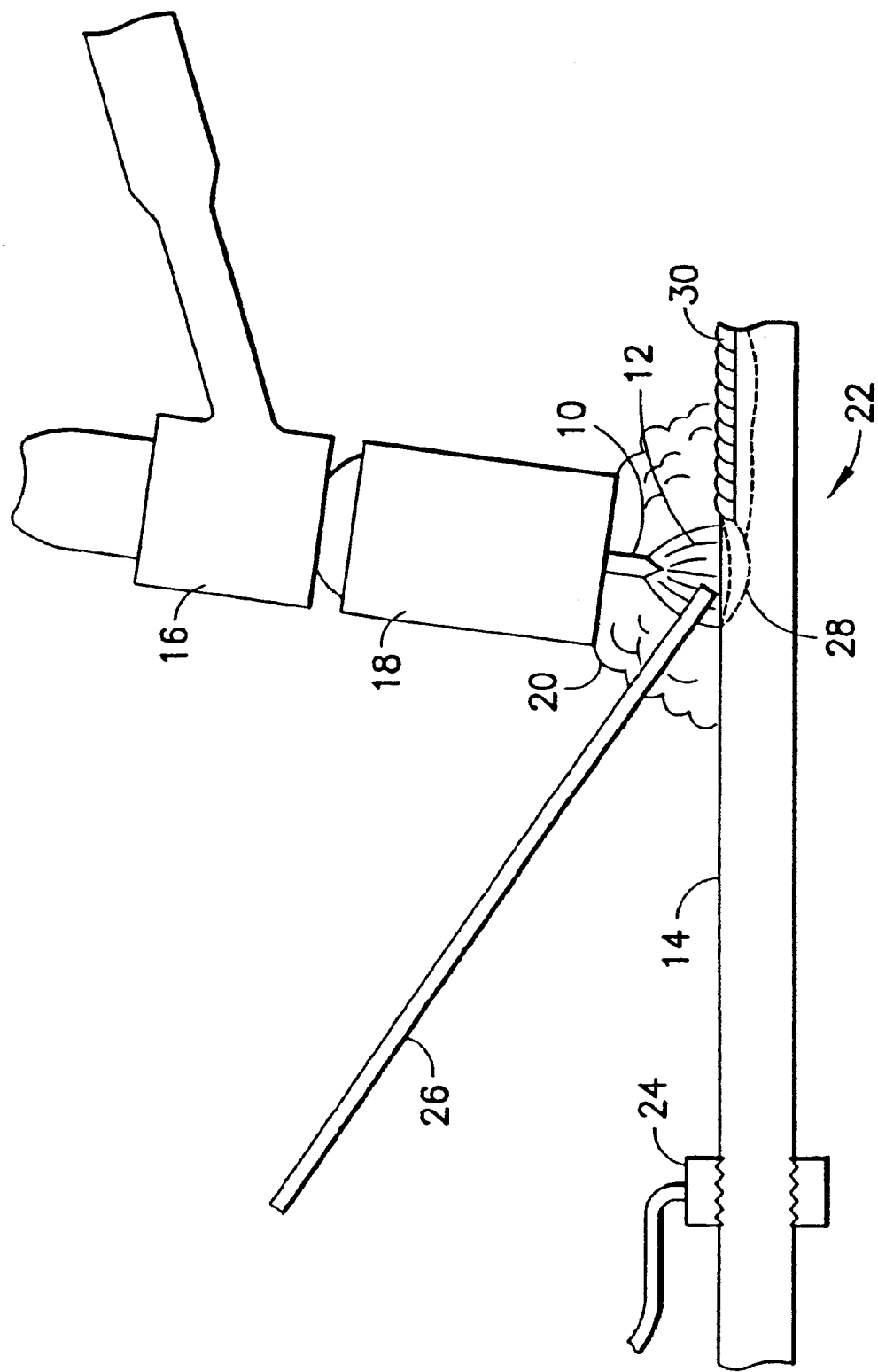
FIG. 1 is a drawing illustrating a conventional TIG welding operation.
Figure 2:
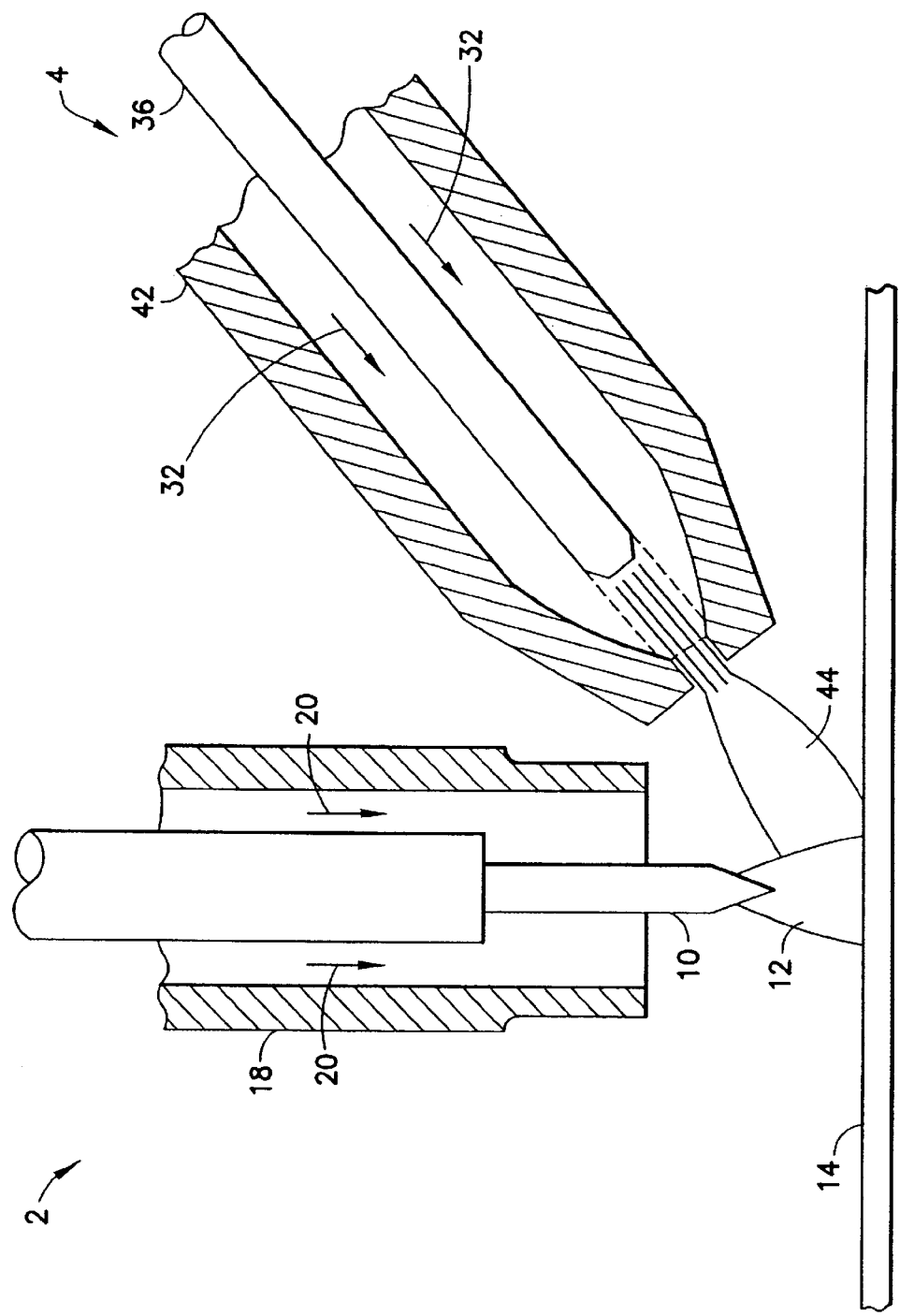
FIG. 2 is a drawing showing a partial sectional view of a plasma initiation device used in conjunction with a conventional TIG welding torch to practice a method of welding arc initiation in accordance with one embodiment of the present invention.

The basic concept of the invention is illustrated in FIG. 2, which shows a setup for TIG welding arc initiation. The workpiece 14 is positioned with the welding site disposed directly underneath the tip of a tungsten electrode 10 of a TIG welding torch 2. The TIG welding torch 2 further comprises a generally circular cylindrical gas cup or shield 18 that surrounds and is generally coaxial with the electrode 10. The cup 18 defines the outer boundary of a generally annular passageway through which a shielding gas, such as argon, helium, a mixture thereof, or other inert or non-inert gas, flows. The shielding gas flow is indicated by arrows 20 in FIG. 2. The shielding gas is conveyed to the welding torch from a gas supply tank by means not shown, which means typically include a cable that connects the welding torch to the power supply unit. Typically the cable carries both shielding gas and electric power to the welding torch.

FIG. 2 depicts an instant in time immediately following initiation of a welding arc 12 between the electrode 10 and the workpiece 14. In accordance with the embodiment depicted in FIG. 2, the welding arc is initiated with the aid of a plasma initiation device 4, shown disposed at an oblique angle relative to both the TIG welding torch 2 and the workpiece 14. The plasma initiation device comprises a plasma electrode 36 and a nozzle 42 surrounding and generally coaxial with the plasma electrode 36. The nozzle 42 defines the outer boundary of a generally annular inner passageway through which an ionizable gas, such as argon, flows. This flow of plasma gas is indicated by arrows 32 in FIG. 2. The inner passageway converges to a circular orifice at the distal end of the inner nozzle 42. The plasma initiation device 4 operates in conventional fashion to produce a plasma jet 44 of high-temperature ionized gas that exits the nozzle 42 via the circular orifice at its distal end.

To start the plasma initiation device, a conventional starting method may be used. In accordance with the embodiment depicted in FIG. 2, the nozzle 42 is stationary with respect to the handle (not shown) of the plasma initiation device. The nozzle 42 is made of electrically conductive material. The plasma electrode 36 is axially displaceable, relative to the nozzle 42, between a first axial position whereat the nozzle 42 is not in contact with plasma electrode 36 (shown by solid lines in FIG. 2) and a second axial position whereat the nozzle 42 contacts plasma electrode 32 (shown by dashed lines in FIG. 2). For example, the distal end of the plasma electrode 36 could be a truncated cone, in which case the conical periphery of the plasma electrode tip would contact a seat formed along the peripheral edge of the circular orifice of the nozzle 42. In the second axial position, the nozzle 42 contacts the plasma electrode along the periphery of the electrode tip, thereby closing off the inner passageway and fully or partially blocking the flow of plasma gas 32. When the nozzle 42 is not in contact with the plasma electrode 36, the nozzle 42 forms a plasma chamber between the plasma electrode and itself.

The plasma initiation device shown in FIG. 2 is started by applying an electric potential between the plasma electrode 36 and the nozzle 42, and then retracting the plasma electrode in the axial direction (i.e., from the position indicated by dashed lines in FIG. 2 to the position indicated by solid lines) to separate the electrode from the nozzle. As a result, an arc is initiated. The gap between the plasma electrode 36 and the nozzle 42 allows the gas and arc to escape through the orifice, thereby creating a plasma jet. The jet is then directed between the welding tungsten electrode and the workpiece, as explained in more detail below.

Any other conventional means for starting a plasma arc, such as the application of a high-frequency signal, can be used.

In accordance with the embodiment shown in FIG. 2, a welding arc is initiated between the tungsten electrode 10 and the workpiece 14 by holding the TIG torch 2 in a position wherein the tip of the tungsten electrode 10 is separated from and not in contact with the workpiece 14, turning on the shielding gas flow 20, applying an electrical potential between the electrode 10 and the workpiece 14, and then directing the plasma jet 44 into the space between the tip of electrode 10 and the workpiece 14. The presence of the ionized plasma gas in the space separating the TIG torch and the workpiece increases the conductivity of the gaseous medium separating the two. This, in turn, has the effect of reducing the voltage threshold at which an arc between the electrode tip and the workpiece will be produced. For example, the aforementioned electric potential applied between the tungsten electrode 10 and the workpiece 14 is less than the voltage threshold required to initiate an arc when the plasma gas is not present, but greater than the voltage threshold required to initiate an arc when the plasma gas is present. Thus, by directing the plasma jet into the gap between the electrode and the workpiece, a welding arc 12 can be initiated.

FIG. 2 shows two devices that must be handled and operated concurrently. This may be inconvenient in situations where a solitary welder must operate the equipment without assistance. Accordingly, the plasma initiation device could be attached to a TIG torch by any suitable means, with the axes of the respective electrodes forming an acute angle.

Figure 3:
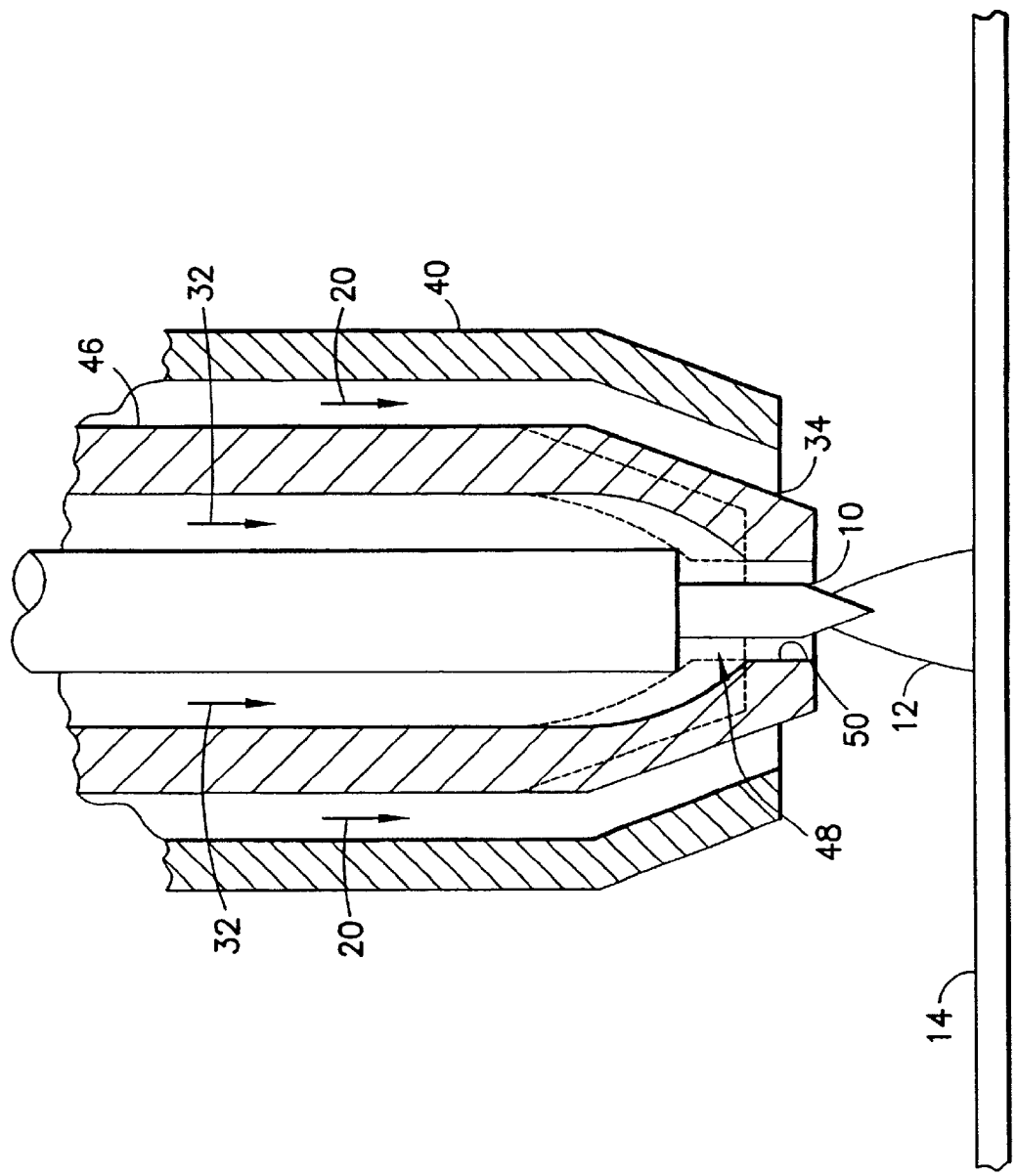
FIG. 3 is a drawing showing a partial sectional view of a TIG welding torch in accordance with another embodiment of the present invention.

In accordance with another embodiment of the invention, depicted in FIG. 3, the means for generating a plasma jet is incorporated within the TIG welding torch. In this case, the torch comprises a tungsten electrode 10, a contact shield or nozzle 46 surrounding and generally coaxial with electrode 10, and an outer nozzle or shielding cup 40 surrounding and generally coaxial with the contact shield 46. The inner surface of the contact shield 46 defines the outer boundary of a generally annular inner passageway through which an ionizable plasma gas flows. This flow of plasma gas is indicated by arrows 32 in FIG. 3. The inner passageway converges to a circular orifice at the distal end of the contact shield 46. In addition, the outer surface of the contact shield 46 defines the inner boundary and the inner surface of the outer nozzle 40 defines the outer boundary of a generally annular outer passageway through which shielding gas flows. This flow of shielding gas is indicated by arrows 20 in FIG. 3. The outer passageway converges to an annular orifice that surrounds the contact shield 46. The surfaces forming the passageways may be surfaces of revolution.

In accordance with the embodiment depicted in FIG. 3, the tungsten electrode 10 is stationary with respect to the torch handle (not shown). The outer nozzle or shielding cup 40 is also stationary with respect to the torch handle. The contact shield 46 is made of electrically conductive material and is axially displaceable, relative to the electrode 10, between a first axial position whereat the contact shield 46 is not in contact with electrode 10 (shown by solid lines in FIG. 3) and a second axial position whereat the contact shield 46 contacts electrode 10 (shown by dashed lines in FIG. 3). In the second axial position, the contact shield contacts the electrode along the entire perimeter of the latter, thereby closing off the inner passageway and fully or partially blocking the flow of plasma gas 32. When the contact shield 46 is not in contact with the electrode 10, the contact shield forms a plasma chamber between the electrode and itself.

The method for initiating an arc between the tungsten electrode 10 and the workpiece 14 comprises the following steps. Initially the contact shield 46 is in the position indicated by solid lines in FIG. 3, to wit, not in contact with the tungsten electrode 10. In this non-contacting state, one electrical potential is applied between the electrode 10 and workpiece 14, while another electrical potential is applied between electrode 0 and the contact shield 46. This may not be applied until it is sensed that the two parts are touching. Then the contact shield 46 is moved axially from the position of no contact with the electrode 10 to a position where it is in contact with the electrode (indicated by dashed lines in FIG. 3). Upon contact, current begins to flow between the contact shield 46 and the tungsten electrode 10. Then gas valves (not shown) are opened, allowing shielding gas 20 to flow through the outer passageway and plasma gas 32 to build pressure in the inner passageway. Finally, the contact shield 46 is moved axially from the position in contact with the tungsten electrode 10 to the non-contacting position. This forms a plasma chamber 48 and current continues to flow between the electrode 10 and contact shield 46 as plasma gas 32 flows through the plasma chamber and out a circular orifice 50. The plasma gas flow forces the arc out of the plasma chamber 48, creating an ionized gas or plasma surrounding the end of the electrode 10 and contacting the workpiece 14. Current begins to flow between electrode 10 and workpiece 14, allowing a start to be established. The current flow between the electrode 10 and the contact shield 46 is stopped once the start is sufficiently established. The contact shield 46 may then be retracted to the contact position, if desired.(indicated by dashed lines in FIG. 3). The flow of plasma gas through the inner passageway can now be cutoff. The initiated welding arc 14 is surrounded by a curtain of shielding gas emitted from the annular orifice at the end of the outer passageway.

In accordance with alternative embodiments, instead of moving the contact shield relative to a stationary electrode, the electrode could be moved relative to a stationary contact shield or the electrode and contact shield could both be moved in opposite directions. In either case, the end result will be respective positions in which the electrode and the contact shield respectively contact each other and do not contact each other. The plasma jet is emitted in the latter case, i.e., when the components do not contact and the inner passageway is open. In each case, when the components are not contacting, the tip of the electrode still projects through the orifice at the end of the contact shield to facilitate TIG welding.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A method of initiating an arc between an electrode and a workpiece, comprising the following steps:

causing shielding gas to flow toward the workpiece and around the tip of the electrode;

applying an electrical potential between the electrode and the workpiece; and directing a plasma flow into the space between the tip of the electrode and the workpiece, wherein said directing step comprises forcing plasma gas through a passageway separating the electrode from a surrounding contact shield having an outlet, further comprising the step of applying an electric potential between the electrode and the contact shield.

2. A method of initiating an arc between an electrode and a workpiece, comprising the following steps:

causing an annular curtain of shielding gas to flow toward the workpiece, with the tip of the electrode being disposed within said curtain;

applying an electrical potential between the electrode and the workpiece;

causing current to flow between the electrode and a contact shield that is in contact with the electrode;

filling a space between the electrode and contact shield with plasma gas; and separating the electrode and the contact shield to release said plasma gas toward the workpiece and around the tip of the electrode, the separation between the electrode and contact shield resulting in the production of an arc that is transferred to the workpiece.

3. The method as recited in claim 2, wherein said contact shield is moved and the electrode is stationary during said separating step.

4. The method as recited in claim 3, further comprising the step of retracting the contact shield to a contacting position after said arc has been established between the electrode and the workpiece.

5. The method as recited in claim 2, further comprising the step of reducing the current flowing between the contact shield and the electrode after the transferred arc has been established between the electrode and the workpiece.

6. A method of initiating an arc between an electrode and a workpiece, comprising the following steps:

causing shielding gas to flow toward the workpiece and around the tip of the electrode;

applying an electrical potential between the electrode and the workpiece;

applying an electrical potential between the electrode and a contact shield that surrounds a portion of the electrode and is not in contact with the electrode;

moving the contact shield from a position of no contact with the electrode to a position where it is in contact with the electrode, as a result of which current begins to flow between the contact shield and the electrode;

causing pressurized plasma gas to flow into a space between the electrode and the contact shield, said space being fully or partially closed off by contact of the contact shield with the electrode; and moving the contact shield from the position in contact with the electrode to a position not in contact with the electrode, as a result of which ionized plasma gas flows into the space between the electrode and the workpiece, the foregoing steps resulting in initiation of an arc between the electrode and the workpiece.

7. The method as recited in claim 6, wherein the contact shield is moved axially in parallel with an axis of the electrode.

8. The method as recited in claim 6, further comprising the step of removing said electric potential between the contact shield and the electrode.

9. The method as recited in claim 6, further comprising the step of retracting the contact shield to the contact position after an arc has been established between the electrode and the workpiece.

10. A torch comprising:

an electrode;

a first shield surrounding said electrode to form a first passageway therebetween; and a second shield surrounding said first shield to form a second passageway therebetween, wherein second passageway does not communicate with said first passageway via any passageway in said first shield, and at least one of said electrode and said first shield is movable relative to the other in an axial direction, said first shield being in contact with said electrode in a first positional state and not in contact with said electrode in a second positional state, said first passageway being not blocked when said electrode and said first shield are in said second positional state.

11. The torch as recited in claim 10, wherein said first passageway is filled with plasma gas and said second passageway is filled with shielding gas.

12. The torch as recited in claim 10, wherein said electrode comprises a tip made of tungsten.

13. The torch as recited in claim 10, wherein said first shield is at an electric potential relative to said electrode.

14. The torch as recited in claim 10, wherein said electrode comprises a tip that passes through and projects beyond an outlet in said first shield.

15. A system comprising:

an electrode comprising a tip;

a workpiece disposed at a distance below said tip of said electrode, said workpiece being at an electric potential relative to said electrode;

means for directing shielding gas to flow toward said workpiece and around said tip of said electrode; and means for directing a plasma flow into the space between said tip of said electrode and said workpiece that initiates an arc therebetween, wherein said plasma flow directing means comprise a contact shield that surrounds a portion of said electrode, said contact shield having an outlet that defines the cross-sectional shape of said plasma flow, said electrode tip passing through and projecting beyond said outlet of said contact shield.

16. The system as recited in claim 15, wherein said electrode is not consumable.

17. The system as recited in claim 15, wherein said electrode comprises a tip made of tungsten.

18. The system as recited in claim 15, wherein said contact shield has an interior surface that is a surface of revolution.

19. The system as recited in claim 15, wherein said shielding gas directing means comprise an outer shield that is outside of and substantially concentric with said contact shield.

20. The system as recited in claim 15, wherein said contact shield is movable in a direction parallel to an axis of said electrode between a first position whereat said contact shield contacts said electrode and a second position whereat said contact shield does not contact said electrode.

* * * * *